United States Patent [19] [11] 4,126,551
Cognevich [45] Nov. 21, 1978

[54] METHOD AND APPARATUS FOR HANDLING SOLVENT EXTRACTION CRUD

[75] Inventor: Dimitry J. Cognevich, Metairie, La.

[73] Assignee: Freeport Minerals Company, New York, N.Y.

[21] Appl. No.: 785,946

[22] Filed: Apr. 8, 1977

[51] Int. Cl.$^2$ ............................................. B01D 21/04
[52] U.S. Cl. ...................................... 210/83; 210/159; 210/236; 210/241; 210/271; 210/525
[58] Field of Search .................. 210/83, 153, 159, 171, 210/195 S, 197, 236, 241, 523, 525, 538, 270, 271; 292/124, 125, 122, 224, 225; 198/746, 747, 748, 750

[56] References Cited

U.S. PATENT DOCUMENTS

| | | | |
|---|---|---|---|
| 659,916 | 10/1900 | Davis | 210/271 |
| 2,305,929 | 12/1942 | Lund et al. | 210/525 |
| 3,055,313 | 9/1962 | Stoll et al. | 198/750 |
| 3,498,465 | 3/1970 | Klump et al. | 210/525 |

FOREIGN PATENT DOCUMENTS 390,989 4/1933 United Kingdom ..................... 210/525

*Primary Examiner*—Frank Sever
*Attorney, Agent, or Firm*—Fisher, Christen & Sabol

[57] ABSTRACT

An apparatus and method are provided for handling the problem of crud formation in solvent extraction equipment. "Crud" is the name commonly given to the thick interfacial layer of semi-floatable material that accumulates and interferes with many solvent extraction operations.

The apparatus disclosed is used in combination with mixer-settler equipment, and it includes a rotatable shaft, a blade mounted on the shaft, apparatus for moving the shaft and blade across a plane parallel to the surface of the liquid inside a rectangular settler vessel, equipment for rotating the blade and shaft about the shaft's longitudinal axis, and a locking device for locking the blade into an extended or retracted position. The method disclosed provides for lowering the blade into the liquid periodically and slowly traversing the length of the settler vessel; moving the crud mass toward one end of the vessel and causing it to be compressed therein; rotating the shaft and blade which causes the compressed crud to flow over a high-level weir at the end of the vessel; locking the blade with both faces parallel to the settler's surface and returning it to its original position, or to any other convenient predetermined position, from which it can be subsequently lowered again below the liquid level to start another cycle.

The invention is particularly applicable to the solvent extraction recovery of uranium from wet-process phosphoric acid.

10 Claims, 8 Drawing Figures

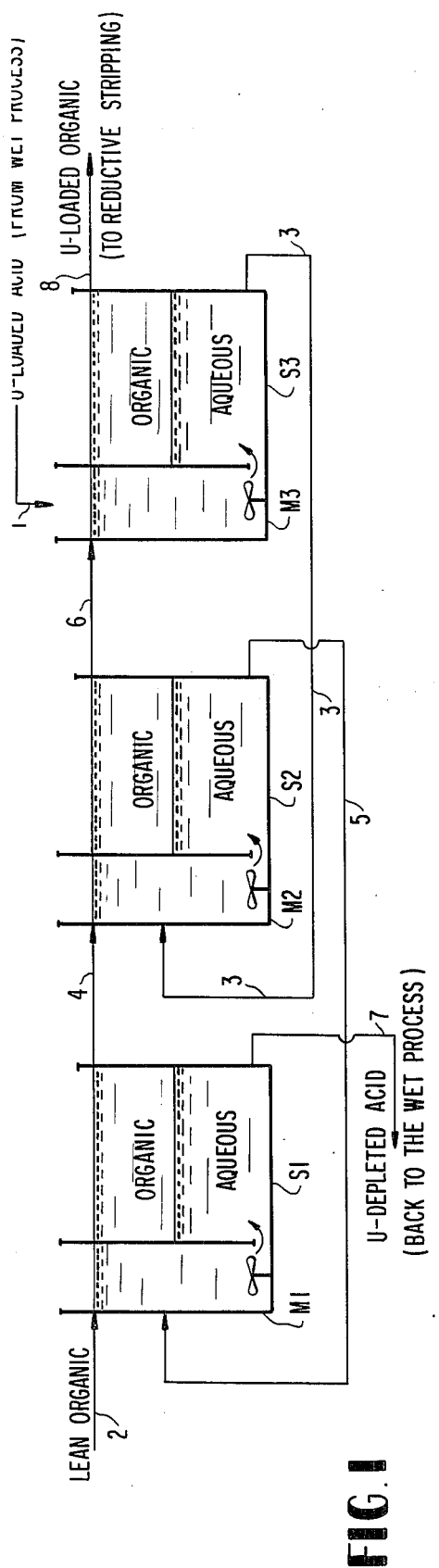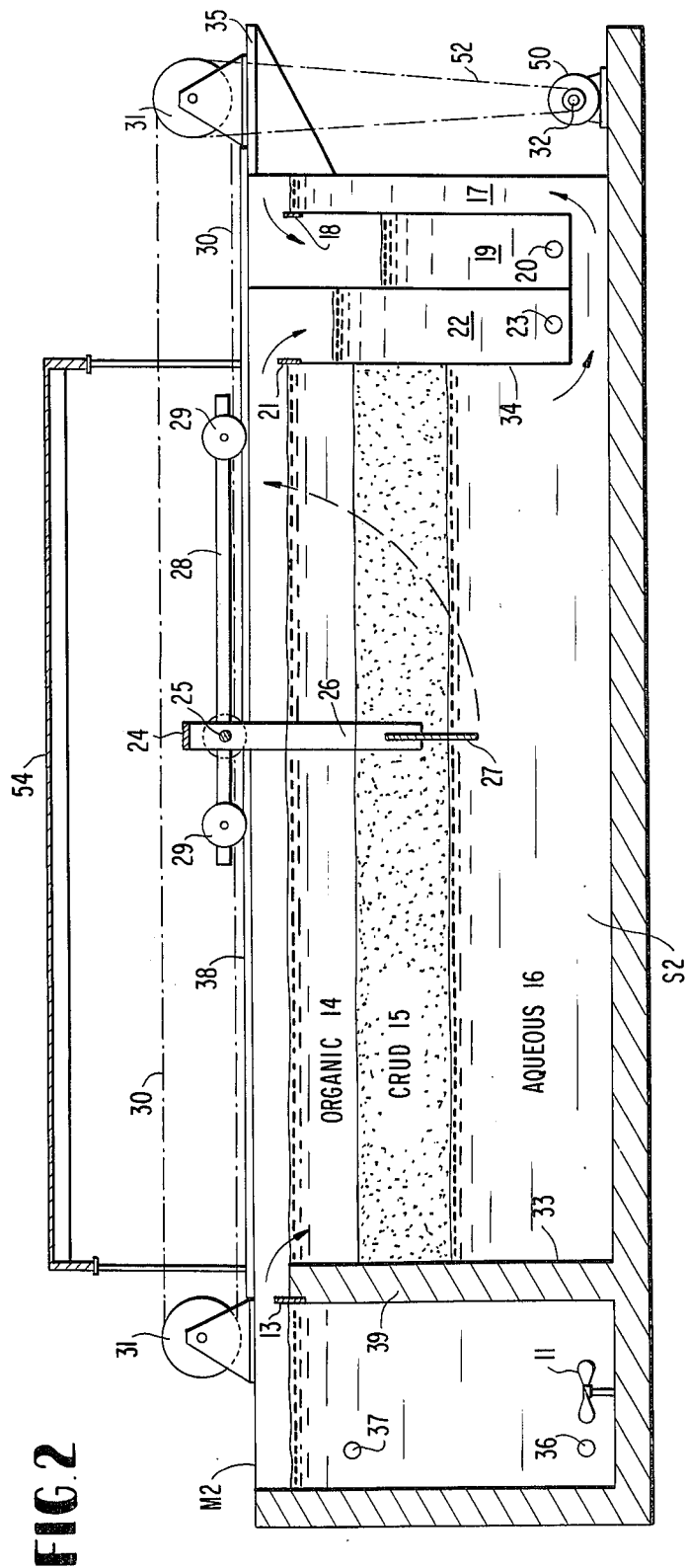

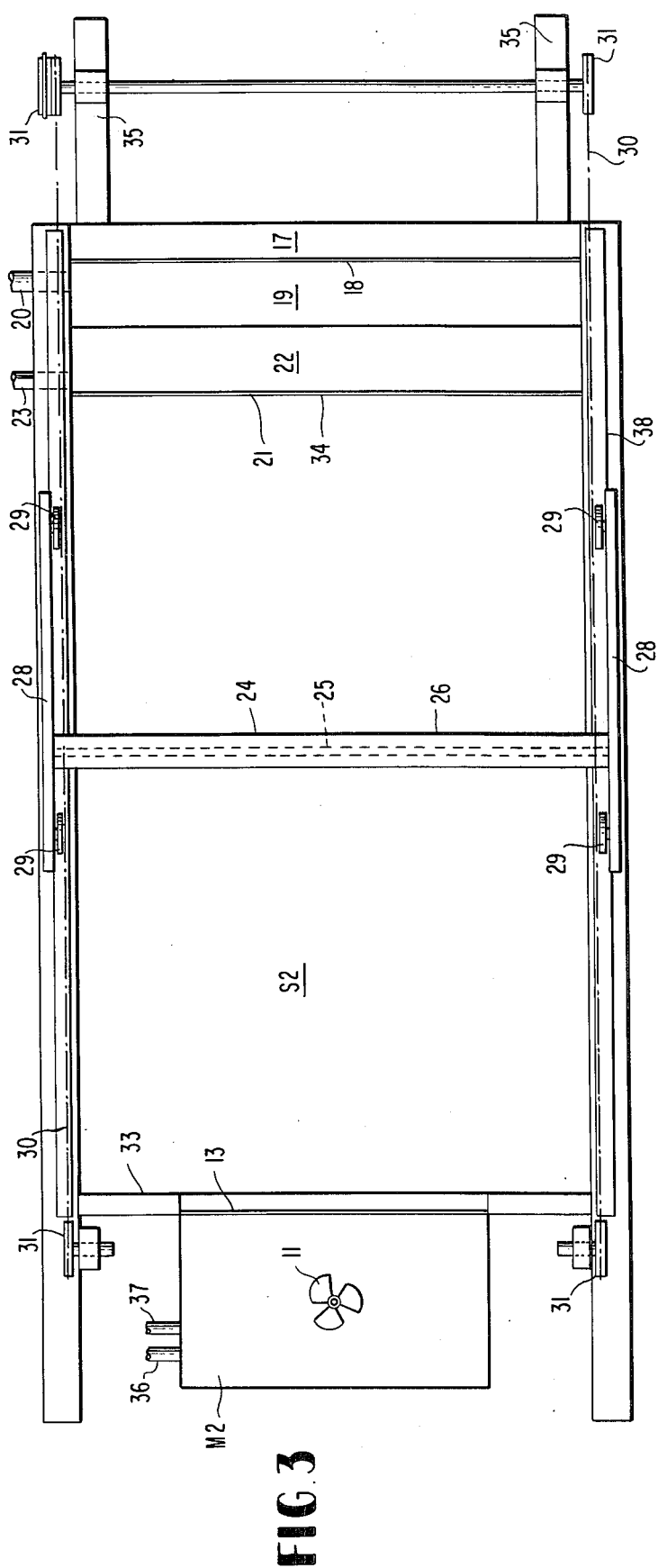
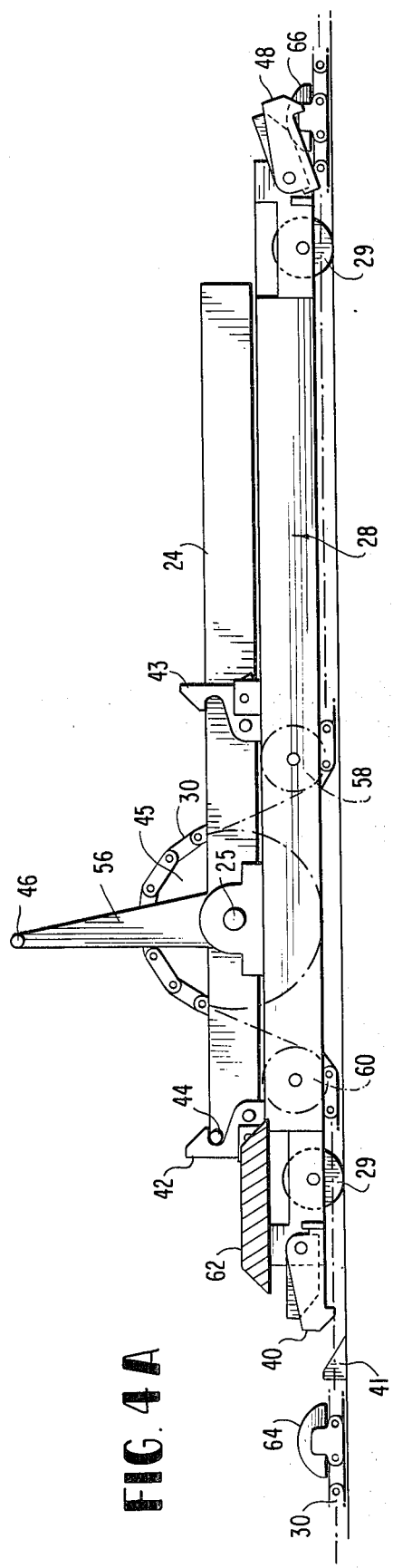
FIG. 3
FIG. 4A

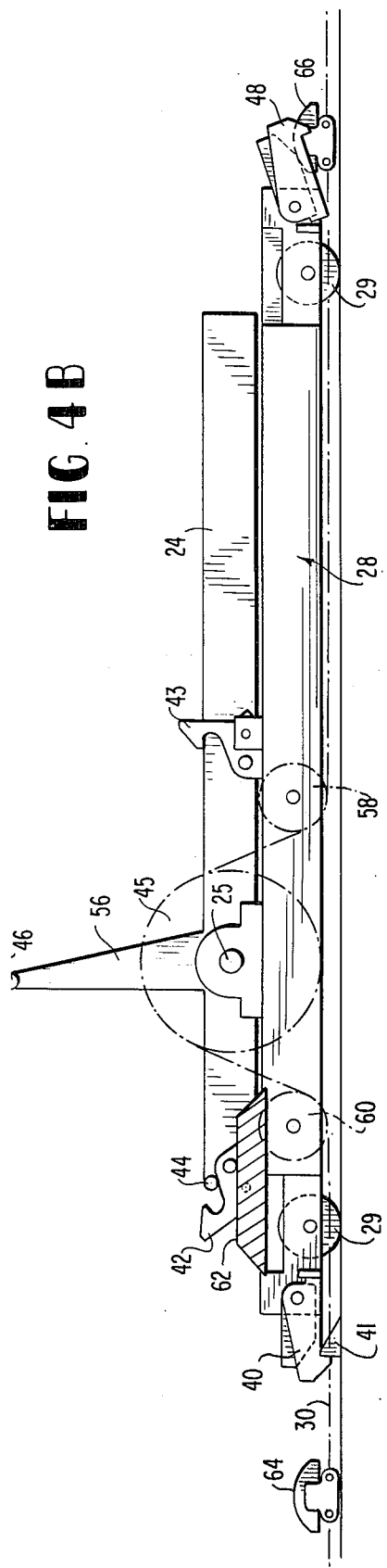
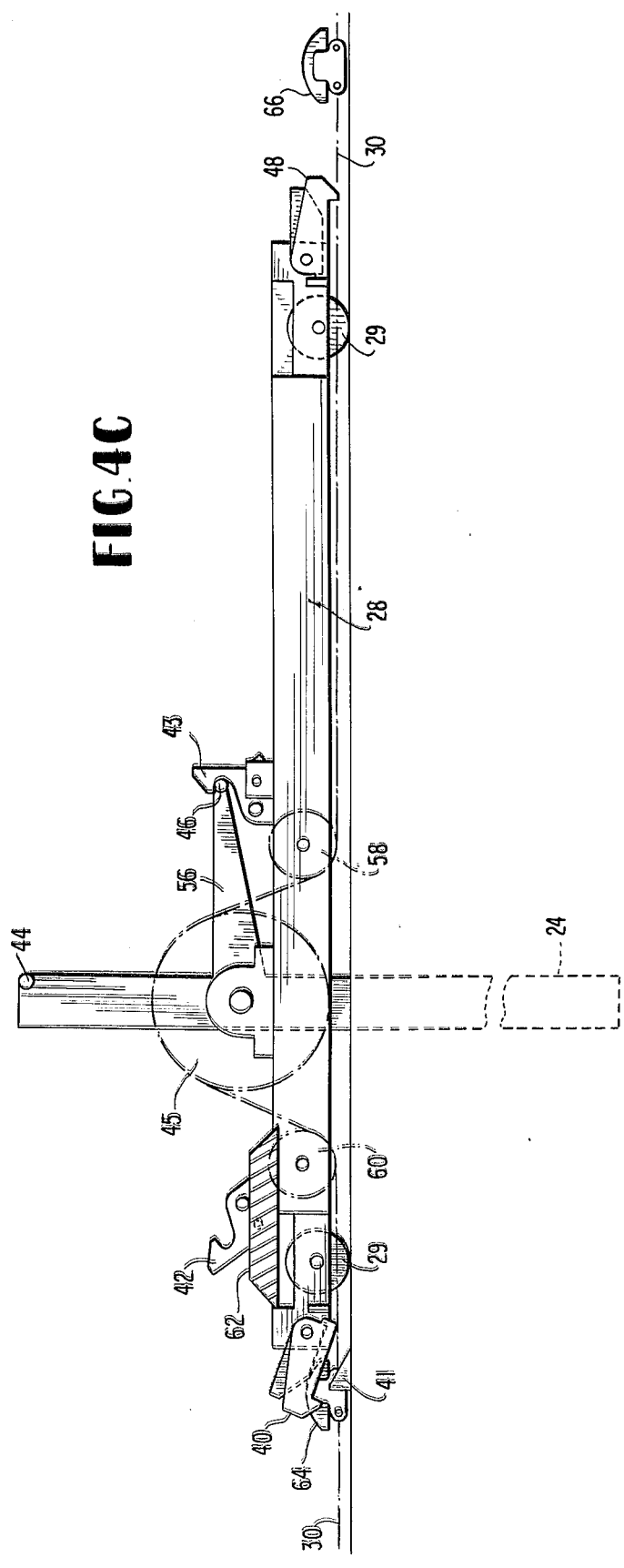

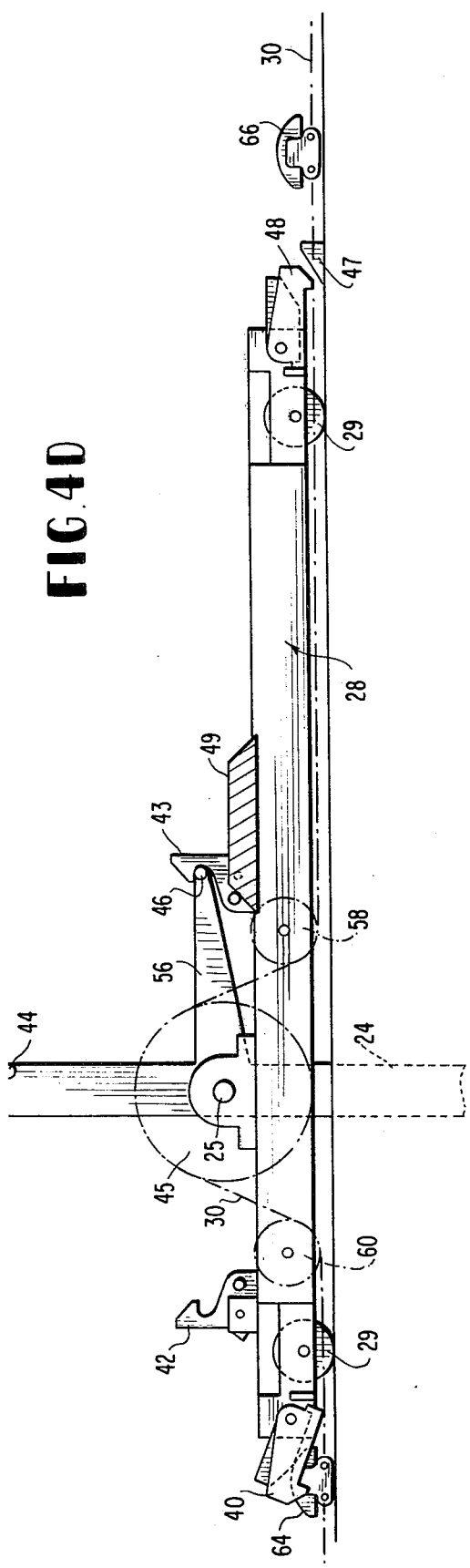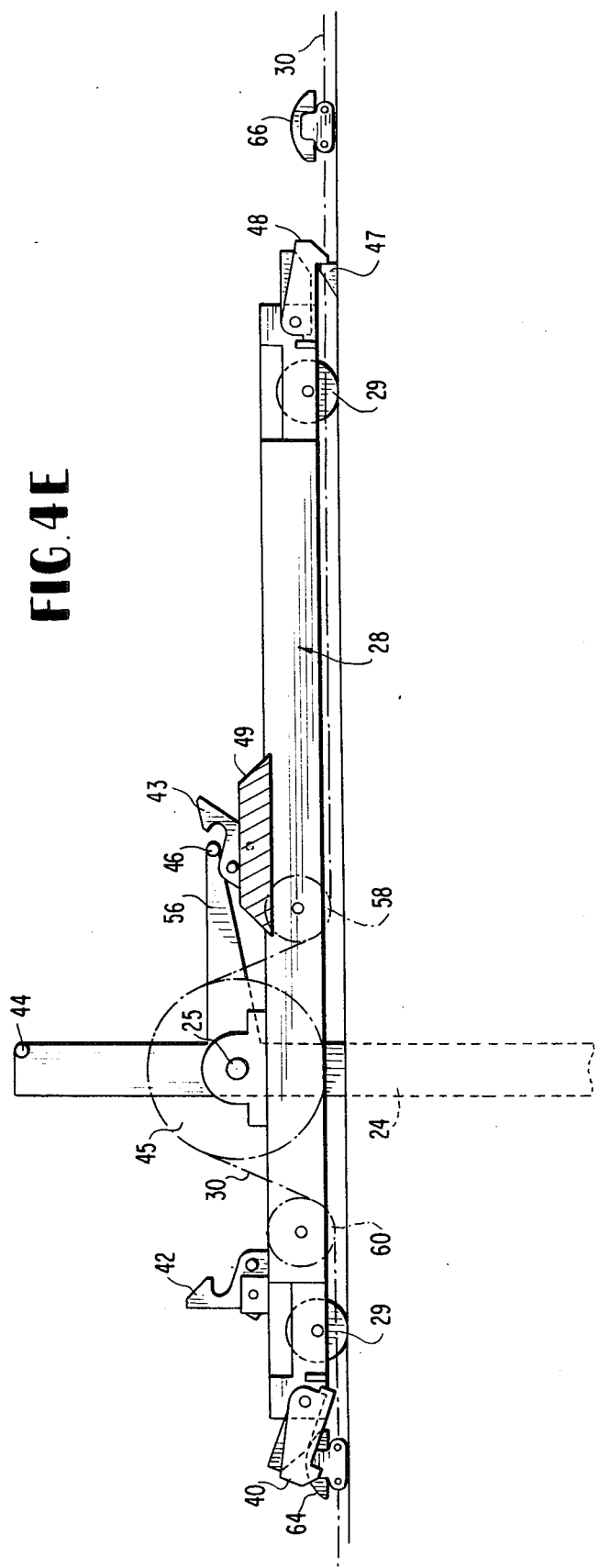

METHOD AND APPARATUS FOR HANDLING SOLVENT EXTRACTION CRUD

FIELD OF THE INVENTION

This invention relates to solvent extraction techniques, and in particular, to solvent extraction techniques where a substantial portion of the solvent extractant is made up of organic compounds that tend to form crud. The invention also relates to a method and apparatus for handling the crud that tends to form in certain solvent extraction operations, and, particularly, in the solvent extraction of wet-process phosphoric acid with organic extractants.

Still more particularly, the invention is concerned with a method and apparatus for handling the layer of undesirable interfacial crud that forms during the solvent extaction of unranium values from wet-process phosphoric acid with certain organic extractants.

DESCRIPTION OF THE PRIOR ART

The term "crud" is commonly used to refer to a thick interfacial layer of semi-floatable suspended material which tends to form, and does form, during certain solvent extraction operations. When crud appears on the course of these operations, its formation is usually associated with the coming together of fine particulate solids that enter the process with one or both of the phases being contacted and the solvent organic used to extract the desired component or components. Crud-forming materials are also believed to enter these operations with other process streams that often have to be used at some point or another in order to provide, for example, beneficiating agents, defoamers, phase stabilizers, etc. In the case of solvent extraction of wet-process phosphoric acid, for example, crud-forming materials are thought to include a number of organic and inorganic solid compounds such as sulfates, fatty acids, humic substances tallow amines, siliceous materials, iron compounds, aluminum compounds, and others. In most cases, however, the actual composition and the exact mechanism by which crud forms are not accurately known or completely understood. Nevertheless, it is an established fact that when the crud forms, its presence interferes with the separation of the phases in the mixer-settler units that are normally employed in these processes and clog or otherwise interfere with the operation of the extraction equipment. Often, when the organic extractant used is an expensive one — and usually they are very expensive — organic losses due to the affinity of the organic for the solids associated with the crud might be of such magnitude as to make the whole process economically unfeasible.

A typical example of a solvent extraction process that suffers from the infirmities of crud formation problems is the solvent extraction of wet-process phosphoric acid, and, in particular, the solvent extraction of wet-process phosphoric acid with the type of solvent extractants known to selectively extract uranium and rare earths from the acid. Examples of such selective extractants are the mono- and disubstituted phenyl esters of orthophosphoric acid dissolved in inert diluents and the synergistic mixtures of dialkylphosphoric acids and trialkylphosphine oxides dissolved in inert diluents. Extraction processes that make use of these selective extractants are described, for example, in U.S. Pat. No. 3,737,513; 3,711,591; and 3,835,214.

One way of handling the problems caused by crud formation is, of course, to prevent or minimize the formation of the crud. One such method for preventing or minimizing formation of crud has been disclosed in commonly-assigned U.S. application Ser. No. 656,981, entitled, "Method of Treating Phosphoric Acid to Prevent Crud Formation During Solvent Extraction". While this method produces quite satisfactory results, it requires the installation of a chemical treatment circuit prior to the extraction stages, and, also, it introduces new streams into the process which, naturally, have to be properly handled and carefully controlled so as to avoid any possible contamination and deterioration of the main process streams.

Another way of handling the crud problem is to physically remove the crud from the tank after it has formed. It is known to remove sludge from settling tanks by traversing a carriage across the tanks to scrape the sludge into troughs so it can be removed, such as is shown in U.S. Pat. No. 1,918,742. It is also known to use a traversing carriage attached to the top of a settling tank to scrape the sludge from the bottom of the tank into a trough as is shown in U.S. Pat. Nos. 3,498,466 and 3,498,465.

However, these prior art devices do not provide positive means to remove the scraper from contact with the fluid in the tank and, consequently, during the return of the carriage to its starting position, will disturb the settling in the tank. Also, there is no showing of any means of removing sludge occurring intermediate the top and bottom of the tank as required in an effective crud removing operation.

U.S. Pat. Nos. 579,581; 1,990,458; 2,813,074; 3,204,773; 2,916,148 and 3,443,694 are also believed to be relevant.

SUMMARY OF THE INVENTION

This invention provides an apparatus for use in combination with a mixer-settler unit of the type normally used in many solvent extraction operations. The apparatus includes, in combination with a rectangular settler vessel, a movable carriage for movement across the vessel, a shaft rotatably attached to the carriage, a blade mounted on said shaft, means for rotating the blade about the longitudinal axis of the shaft, and lock means for maintaining the blade in position with respect to its rotation about the shaft. The method involves the operation of the apparatus so as to cause the blade to be lowered into the liquid being processed and locked into a substantially vertical position. From this position, the carriage and the blade are made to traverse the length of the settler slowly, moving the crud mass toward one end of the vessel and causing it to be compressed therein. At a predetermined point along said length of the settler, the carriage for moving the shaft and blade across the surface and the means for rotating the blade about its shaft are operated to stop the traverse of the carriage and blade and rotate the blade about the axis of the shaft so as to cause the compressed crud to flow over the high-level weir at the end of the settler. The lock means then locks the blade in a substantially horizontal position, and, thereafter, the apparatus is operated to return the blade to its original position, or to any convenient predetermined position, from which it can be subsequently lowered into the liquid to start another cycle.

It is an object of this invention to provide a solution to the problems associated with crud formation in solvent extraction processes.

In particular, it is an object of this invention to provide a method and apparatus for handling the problems of crud formation during the solvent extraction of uranium and rare earths from wet-process phosphoric acid.

An even more particular object of this invention is to provide a method and apparatus for handling the crud formation problems of a solvent extraction process for the recovery of uranium values from wet-process phosphoric acid, which method and apparatus solve said problems without the need of a chemical treatment prior to or during the extraction stages.

These and other related objects of this invention will be apparent to those skilled in the art from the description that follows.

BRIEF DESCRIPTION OF THE DRAWINGS

FIG. 1 is a schematic diagram of a solvent extraction process with which the present invention is utilized.

FIG. 2 is a side sectional view of one of the settling tanks of FIG. 1, showing the present invention.

FIG. 5 is a top view of the tanks of FIG. 2.

FIGS. 4A–4E are detailed views of the crud scraper mechanism according to the present invention, showing its various positions.

DETAILED DESCRIPTION OF THE PREFERRED EMBODIMENT

The preferred embodiment of the invention is illustrated in FIGS. 1–4, and it involves the application of the method and apparatus to a solvent extraction operation for the recovery of uranium from wet-process phosphoric acid. The primary extraction stages used in one such solvent extraction operation are illustrated in FIG. 1, where three mixer-settler stages are shown as they would be used in a countercurrent extraction operation.

While the method and apparatus of this invention are particularly suitable to the solvent extraction of uranium from wet-process phosphoric acid by the above-mentioned selective extractants, and, while, for convenience, the invention will be described hereafter in terms of its application to one such process, it will be understood that said method and apparatus are useful in any of a number of solvent extraction processes in which crud is formed at the interface region between the extract and the raffinate and, which, consequently, suffer from the infirmities of poor phase disengagement, high losses of organic extractant, clogging of extraction equipment, and any of the other disadvantages associated with the formation of crud in these systems. Examples of some other processes in which the method and apparatus of this invention may be used include those processes described in U.S. Pat. Nos. 3,700,418; 3,437,454; 3,458,282 and 3,694,153.

Referring now to FIG. 1, a uranium-loaded phosphoric acid 1, manufactured by the wet process, is extracted with an organic extractant 2 to produce a uranium-loaded organic extract 8 and a uranium-depleted acid raffinate 7 in three extraction stages. Each of these stages consists of one mixer, where the two phases are intimately contacted while under agitation, and one settler, where the mixed phases are allowed to disengage from each other and are separated by withdrawing the lighter organic from the top of the settler vessel and the heavier aqueous from the bottom. If the extraction is that of wet-process phosphoric acid with an extractant made up of dialkylphosporic acid and a dialkylphosphine oxide dissolved in an organic diluent such as kerosene in a countercurrent fashion, the acid to be extracted illustratively enters the last stage of the three-stage operation as uranium-loaded acid stream 1, into mixer M3, and leaves the operation from the first stage as uranium-depleted acid 7. Likewise, the extractant enters the first stage as lean organic 2 and leaves the last stage as uranium-loaded organic 8, out of settler S3.

The first stage consists of mixer M1 and settler S1. Lean organic 2 enters M1, where it contacts aqueous stream 5. Although the mixer M1 may have any type of construction, a typical mixer has a brick-lined mixing chanber of approximately $9 \times 9 \times 4$ feet, and a two-speed agitator. Aqueous stream 5 is a recycle stream from the secone stage, as will be explained below. From mixer M1, the mixture of aqueous and organic passes to settler S1 where it separates into uranium-enriched organic 4 and uranium-depleted acid 7. Settler S1 may be constructed of stainless steel with a carbon brick lining having dimensions of $80 \times 20 \times 6$ feet with a 5 foot liquid level. The bottom may slope at the rate of $\frac{1}{8}$ inch per foot. Although this is a typical construction, any other known construction may be used. Uranium-depleted acid 7 has passed through all three stages of the operation and has had its uranium content extracted from it by the organic extractant, and now goes back to the wet process to be sold as such, or further processed, for example, in order to further purify it and concentrate it to a higher $P_2O_5$ strength before being delivered to a customer. Uranium-enriched organic 4 overflows the top of settler S1 and is fed into mixer M2 where it contacts aqeuous stream 3 from settler S3. From mixer M2, the mixed organic and aqueous flow to settler S2 where the two phases are once again separated and flow out of the settler as further-uranium-enriched organic 6 and aqueous stream 5, which is then recycled to mixer M1 contacting incoming lean organic 2, as already explained. Organic stream 6 then contacts incoming uranium-loaded acid 1 in mixer M3, and the resulting mixture is separated into uranium-loaded organic 8 and recycled aqueous stream 3 by means of settler S3. Uranium-loaded organic 8 is then further processed to recover the extracted uranium from it. One manner of processing the loaded organic for this purpose is by means of the "reductive stripping" technique, described in commonly-assigned U.S. Pat. No. 3,737,513, whereby the loaded organic is stripped with a solution of phosphoric acid or hydrofluoric acid having divalent iron dissolved in it. Other techniques are also available to recover the uranium from the loaded extractant, and these are generally known throughout industry by those familiar with solvent extraction operations.

As already stated, the solvent extraction crud tends to form at the interface region between the organic phase layer and the aqueous phase layer in the settlers. The volume of crud formed depends on a number of variables, such as the type of organic used, the velocity of the fluids in the extraction stages, the settling operation retention time and the use or non-use of pretreatment techniques designed to minimize crud formation, just to name a few. In this invention, it is contemplated that the method and apparatus provided be used in an operation where the crud is allowed to form for a period of time and then periodically removed from the settlers as this becomes necessary, leaving to the operator the discretion of how often this removal should be effected to make the overall operation more efficient. Nevertheless, the method and apparatus of this invention may also be used in a continuous manner, if this mode of operation proves to be efficient.

In FIG. 2, which is a side view of one stage of the three-stage operation illustrated in FIG. 1, the crud layer 15 is shown as it may be formed, between an organic layer 14 and an aqueous layer 16, in a typical settler S2, which is built in combination with a mixer M2 and is separated from it by a partition 39. In this arrangement, streams 3 and 4 of FIG. 1 enter mixer M2 through conduits, e.g. pipelines, 36 and 37, respectively, as illustrated in FIG. 2. Mixer M2 is provided with an agitator 11 and with an overflow weir 13. From the mixer, the mixture of organic and aqeuous flows over weir 13 into settler S2. Settler S2 is a rectangular vessel with a settling area several times that of mixer M2 and provided with a substantially flat bottom and an overflow weir 21. Overflow weir 21, adjustable for level control, is located on the end side 34 of settler S2, and it allows the lighter fluid to overflow from the settling area into adjacent compartment 22 where it connects with and leaves the stage through conduit 23. In FIG. 2, the organic stream leaving through conduit 23 represents organic stream 6 of FIG. 1 leaving the second stage and going to the third stage of the extraction operation. The heavier aqueous phase 16 settles down and leaves the settling area by flowing under end 34 and into compartment 17, from which it overflows through weir 18 into compartment 19. From compartment 19, the aqueous acid phase leaves through conduit 20. In FIG. 2, the aqueous stream leaving through conduit 20 represents aqueous stream 5 of FIG. 1 leaving the second stage and going to contact incoming lean organic 2 in the first stage.

It is in combination with this type of mixer-settler arrangement that the apparatus of this invention is best suited for use. As illustrated in FIGS. 2 and 3, the rectangular settler vessel S2, located adjacent to mixer M2, is provided with a railing system 38, which is mounted on top of the walls of the vessel, a carriage 28, which rides on the railing system 38, and a pulley arrangement 31, which is adapted to move the carriage 28 along the railing system. Railing system 38, carriage 28 and pulley arrangement 31 comprise the preferred means for moving the shaft and blade of the apparatus of this invention on a plane parallel to the surface of the vessel. The carriage's main function is to support and transport the shaft and blade. Thus, blade 24 is mounted on shaft 25, such that it rotates with shaft 25 around the longitudinal axis of shaft 25, which, in turn, is rotatably supported by carriage 28. The blade 24 itself may be segmented in order to allow adjustments in its overall length; that is, to permit adjusting the depth to which its lowermost tip will extend into the crud and aqueous layers when in the process of moving crud, as will be explained hereinafter. Thus, for example, a blade segment 27 may be adjustably connected to the main body 26 of blade 24 in such a way as to allow it to be positioned at different depths inside the settler by simply moving it in and out (up and down) of the main body 26 and locking it into position. Alternatively, the pivoting means that pivot the blade about the shaft can take the form of several, e.g., two or three, elongated arms having equally-spaced perforations or any other suitable means for attaching, e.g., bolting the blade to the arms at various positions along the lengths of the arms. The materials of construction of the blade and its adjustable segments, if any are used, are a matter of design considerations. Synthetic plastics, stainless steel and plywood are examples of materials that may be used. Preferably, the blade is made of a fiberglass material.

Carriage 28 is provided with wheels 29 to ride on railing system 38. The carriage also supports the means for locking the blade in position with respect to its rotation with the shaft.

The pulley arrangement may consist of any of a number of pulley systems that will facilitate the traversing movement of the carriage, shaft and blade on the railings. As illustrated in FIGS. 2 and 3, this arrangement may have several pulley wheels 31, a chain 30 and, if necessary, a support 35 attached to the settler vessel for supporting at least some of the pulley wheels. The arrangement may be driven by a reversible electric motor 50, having an output shaft 32 connected to one of the pulley wheels 31, via chain 52, or by any other practical means for imparting rotational motion to the pulley wheels.

The means for rotating the blade about the longitudinal axis of the shaft comprise a chain-and-sprocket mechanism connected to shaft 25. This mechanism may be operated independently of the pulley arrangement, or in conjunction with the pulley arrangement 31 and chain 30. More preferably, the chain-and-sprocket mechanism is designated to operate in conjunction with the pulley arrangement, as will be described below.

The means for locking the blade in position with respect to its rotation about the shaft may be conveniently located on support carriage 28. They may simply be pins so positioned as to impede the movement of the blade with respect to the shaft after the blade has rotated 90° in either direction. Preferably, however, the means for locking the blade includes a system of latches, designed to engage and disengage one or more latches on the blade. The details of the chain-and-sprocket mechanism for rotating the blade and the details of the lock means for maintaining the blade in a substantially horizontal position, or substantially vertical position as the case may be, are illustrated in the description of the method of this invention, below.

As already stated, the method of this invention calls for the operation of the crud-handling apparatus so as to slowly move the crud across and out of the settler vessel to the next stage of the extraction circuit. In its original position, the blade is kep in a retracted, generally horizontal position above and out of the way of the fluid inside the settler. Preferably, the carriage with the blade retracted is kept on the mixer side 33 of vessel S2. In some instances, it might be desirable to provide a roof 54 to protect the settling operation from the environment; i.e., to keep dust and rain out. Also, baffles, to decrease turbulence in the flow of the settling fluids, and vapor seals, to maintain the vapors above the surface of the fluids in the settler isolated from the atmosphere, are often used in these types of mixer-settlers, as is well known among those familiar with the design of these units. The vapor seals serve the purpose of avoiding emissions of vapors to the atmoshere and, at the same time, keep the organic from contacting air, which might oxidize the solvent extractant used. For these reasons, or for whatever other reasons, it might be desirable to design pulley wheel arrangement 31 so as to move blade 24, shaft 25 and carriage 28 completely out of the immediate area on the surface next to settler S2 when the apparatus is not in use. However, it is not necessary that this be done. The blade, shaft and carriage may simply rest in a horizontal, retracted position anywhere above the surface of vessel S2 when not in use. In any case, as shown in FIG. 4, when the blade and shaft are retracted at the feed end (mixer end) of the settler, the means for locking the blade with respect to its rotation about the shaft have been actuated to maintain the blade in a substantially horizontal position with respect to the surface of the fluid inside the settler. The lock means are preferably latch mechanisms 42 and 43 which engage and disengage corresponding latch mechanisms 44 and 46 on the blade 24. Thus, in its retracted ("original") position, the blade's latch 44 is engaged with latch 42 which prevents any rotation about the axis of shaft 25 and keeps the blade 25 in a generally horizontal position.

Blade latch mechanism 46 is attached to arm 56 which extends generally perpendicularly from blade 24.

From this original, generally horizontal, position, the blade 24 is rotated 90° about the axis of shaft 25 to an extended position when it is desired to remove the crud layer 15 from the settling tank S2. Sprocket wheel 45 is attached to shaft 25 so as to rotate therewith and engages chain 30 along the uppermost portion of its periphery, as is seen in FIG. 4. Chain 30 passes under idler sprocket wheels 58 and 60, which are rotatably attached to carriage 28, and over a portion of sprocket wheel 45.

To move the blade 24 to its extended position, the chain 30 is moved toward the left, as is seen in FIG. 4. Since sprocket wheel 45 cannot rotate because it is attached to latched blade 24 via shaft 25, the entire carriage 28 moves with chain 30 until latch 40 engages stop 41. This locks carriage 28 in position and prevents any movement toward the right, as is seen in FIG. 4. Simultaneously, with the latching of latch 40, latches 42 and 44 are disengaged when latch 42 contacts cam 62 attached to an adjacent wall or the top of the settling tank. This frees the blade 24 for rotation about the axis of shaft 25.

The chain 30 is then moved toward the right, as is seen in FIG. 4, thereby causing the sprocket wheel 45, shaft 25 and blade 24 to rotate about the axis of shaft 25 in a clockwise direction. It should be noted that, when the blade is in the vertical position inside the settler, its lowermost tip should extend past crud layer 15 and into aqueous phase 16; that is, the blade should cut through all of organic phase 14, all of crud layer 15 and into aqueous phase 16, as is shown in FIG. 2. While it might be possible to operate the apparatus and effectively move crud without having to provide a significant portion of blade 24 into aqueous phase 16, it is most desirable that a good portion of the blade extends below the crud layer; that is, at least enough of this "free board" should be provided into aqueous phase 16 in order to prevent the "column" of accumulated crud, which will grow vertically in front of the blade as the blade moves across the settler, from backflowing under its lowermost tip and remaining behind. How much "free board" should be provided into the aqueous phase is a matter of design considerations such as the type of crud formed, its thickness and density, the frequency of the cycles, etc. In any case, blade segment 27, which is adjustable with respect to main blade body 26, provides a convenient means for increasing and decreasing the amount of free board into aqueous phase 16 to suit any particular operation.

As the rotation of the blade 24 in the clockwise direction approaches 90°, blade latch 46 engages latch 43 attached to carriage 28. This locks the blade 24 in its extended position. As the chain 30 is moved to the right to rotate the blade to its extended position, cam 64, attached to chain 30, contacts latch 40 to thereby disengage it from stop 41. Thus, once blade 24 is locked in its extended position, as is shown in FIG. 4c, the carriage 28 is free to travel.

Further movement of chain 30 toward the right causes the carriage 28 to move in the same direction across the top of the settling tank. Since the sprocket wheel 45 cannot rotate, it cannot move relative to the chain 30. Thus, movement of the chain 30 will cause movement of the carriage 28. The carriage 28 is slowly drawn across the top of the tank such that the blade 24 pushes the layers of organic solvent and crud, along with a portion of the aqueous (most of the aqueous will flow under and behind the blade), toward end 34 of settling tank S2.

At a predetermined point along its path of travel, latch 48, attached to carriage 28, engages fixed stop 47. While latch 48 is engaging stop 47, latch 43 is contacted by fixed cam 49, thereby disengaging latches 46 and 43 and permitting the blade 24 to rotate in a counterclockwise direction. Once latch 48 engages stop 47, the chain movement to the right is reversed to rotate the blade 24 about the axis of shaft 25 in a counterclockwise direction. Carriage 28 is prevented from moving by the engaging of latch 48 and stop 47. As this rotation takes place, the mass of crud, together with the organic solvent, overflows wier 21 and falls into compartment 22. After the blade 24 has rotated 90° in the counterclockwise direction, latch 44 engages latch 42 to lock the blade 24 in its retracted position. As the blade 24 approaches its locked, retracted position, cam 66, attached to chain 30, contacts latch 48 to disengage it from stop 47. Thus, once the blade 24 is retracted and locked, further chain movement to the left will return the carriage 28 to its original starting position.

It should be noted that the velocity at which the blade and carriage move from one end of the settler to the other should be lower than the bulk velocity of the organic phase in the settler. Bulk velocities of the fluids, i.e., mass of fluid flowing per unit residence time, will vary within design considerations. Normally, the solvent will move faster than the aqueous. It has been found that, if the blade moves across the settler slightly slower than the solvent organic phase, a hydraulic head, or "crest", builds up behind it, and has the effect of tending to push solvent and crud from behind the blade toward the front of it, thus preventing, or at least minimizing, the solvent and crud from escaping through the clearance between the edges of the blade and the walls of the settler and remaining behind.

Also, the rotation of the blade about its shaft in the direction of end side 34, at the discharge end of the settler, should be a slow one. Since the aqueous phase, being heavier than the solvent and heavier than the crud, will drip through the sides and around the tip of the blade as the sprocket-and-chain mechanism raises the blade to a horizontal position and causes the compressed crud and solvent to overflow to compartment 22, a slow rotation would insure that enough aqueous drips in the process of lifting the fluids so as to minimize the small amounts of aqueous that inevitably will overflow wier 21 and move with the crud and solvent to the next stage.

Many modifications can be made to the apparatus and method of this invention without departing from the scope of their basic concent. For example, a ramp (not shown in the Figures) may be provided at the discharge end of the settler to help minimize the amount of crud left behind. Also, a counterweight may be provided on the upper portion of blade 24 to lower the horsepower required to raise the blade at the discharge end of the settler.

From the settler S2, the solvent and the crud move, via conduit 23, to another stage, which, in the case of the system illustrated in FIG. 1, is made up of mixer M3 and settler S3. Streams 8 leaving settler S3 in the system of FIG. 1 has also been handled with the method and apparatus of this invention, and, consequently, contains the crud that has accumulated through several stages. This stream must first be treated to remove the crud from the organic before being fed to the operation, whereby the uranium (or whatever the valuable constituent of the extract happens to be) is recovered from it. In the preferred embodiment, the stream containing the loaded organic and the crud is treated by the method described in commonly-assigned U.S. patent application entitled "Crud Handling Circuit", filed on even date herewith.

The aqueous phase 16, in FIG. 2, flows out of settler S2, via conduit 20, to another stage, which, in the case of the system illustrated in FIG. 1, is made up of mixer M1 and settler S1. In this system, the aqueous phase leaving this first stage is the uranium-depleted phosphoric acid which is returned to the set process, as already explained.

The scope of this invention is to be determined by the appended claims and not limited to the foregoing description and drawings, which are illustrative.

What is claimed is:

1. A method of removing a material from a tank, said material floating within a liquid/liquid interfacial zone, within said tank, said method comprising:
   (a) Positioning a blade within said tank, at a substantially vertical orientation, at a predetermined distance above the bottom of said tank, sufficient to engage said material;
   (b) Locking said blade in said substantially vertical orientation;
   (c) Moving said blade towards one end of said tank;
   (d) Unlocking said blade from said first orientation;
   (e) Pivoting said blade to a substantially horizontal orientation so as to cause said material to be moved over a wall of said tank located at said end thereof;
   (f) Locking said blade in said substantially horizontal orientation;
   (g) Moving said blade away from said end of said tank;
   (h) Unlocking said blade from said substantially horizontal orientation;
   (i) Repeating step (a).

2. The method of claim 1, wherein the blade moves along substantially the entire length of the settlement tank.

3. An apparatus for removing a material from a tank, said material floating within a liquid/liquid interfacial zone within said tank, said apparatus comprising:
   (a) means for positioning a blade within said tank at a substantially vertical orientation at a predetermined distance above the bottom of said tank sufficient to engage said material;
   (b) first means for locking said blade in said substantially vertical orientation;
   (c) means for moving said blade towards one end of said tank;
   (d) first means for unlocking said blade from said first orientation;
   (e) means for pivoting said blade to a substantially horizontal orientation so as to cause said material to be moved over a wall of said tank located at said end thereof;
   (f) second means for locking said blade in said substantially horizontal orientation, said means for moving said blade further functioning to move said blade back toward an opposite end of said tank; and
   (g) second means for unlocking said blade from said substantially horizontal orientation.

4. The apparatus of claim 3 wherein said means for moving said blade toward one end of said tank comprises:
   (a) a carriage movable along the top of said tank, said carriage having said blade attached thereto; and,
   (b) means to move said carriage along said tank.

5. The apparatus of claim 4 wherein said second locking means comprises:
   (a) third latching means attached to said blade; and
   (b) fourth latching means attached to said carriage, such that engagement of said third and fourth latching means locks said blade in its substantially horizontal orientation.

6. The apparatus of claim 4 wherein said first locking means comprises:
   (a) first latching means attached to said blade, and;
   (b) second latching means attached to said carriage such that engagement of the first and second latching means locks said blade in the substantially vertical orientation.

7. The apparatus of claim 6 wherein said first latching means is mounted on an arm extending generally perpendicularly from the plane of the blade.

8. The apparatus of claim 6 further comprising fifth and sixth latching means to lock said carriage in position at either end of its path of travel.

9. The apparatus of claim 4 wherein said means to move said carriage along said tank comprises:
   (a) a sprocket wheel attached to said blade so as to pivot therewith;
   (b) an endless chain engaging at least a portion of said sprocket wheel, and;
   (c) means to drive said endless chain.

10. The apparatus of claim 3 wherein the length of the blade is adjustable to vary the depth at which it extends into the tank.

* * * * *